US008746182B2

(12) United States Patent  (10) Patent No.: US 8,746,182 B2
Anderson  (45) Date of Patent: Jun. 10, 2014

(54) TREAT DISPENSER

(75) Inventor: Norman Anderson, Brooklyn, NY (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 13/524,435

(22) Filed: Jun. 15, 2012

(65) Prior Publication Data

US 2012/0318210 A1 Dec. 20, 2012

Related U.S. Application Data

(60) Provisional application No. 61/498,000, filed on Jun. 17, 2011.

(51) Int. Cl.
A01K 29/00 (2006.01)

(52) U.S. Cl.
USPC ............................ 119/710; 119/711; 119/709

(58) Field of Classification Search
USPC ................ 119/707, 708, 709, 710, 711, 702, 119/51.01; D30/160
See application file for complete search history.

(56) References Cited

U.S. PATENT DOCUMENTS

| 1,534,964 | A | 4/1925 | Kahnweiler |
| 2,086,631 | A | 7/1937 | Munro |
| D188,179 | S | 6/1960 | Tay |
| 4,451,038 | A | 5/1984 | Nagy |
| 4,595,369 | A | 6/1986 | Downs |
| 5,758,604 | A | 6/1998 | Jorgensen |
| 5,813,366 | A | 9/1998 | Mauldin, Jr. |
| 5,819,690 | A | 10/1998 | Brown |
| 5,947,061 | A | 9/1999 | Markham et al. |
| 5,957,082 | A * | 9/1999 | Budman et al. ................. 119/54 |
| 5,965,182 | A | 10/1999 | Lindgren |
| 6,073,581 | A | 6/2000 | Wang |
| 6,098,571 | A | 8/2000 | Axelrod et al. |
| 6,129,053 | A | 10/2000 | Markham et al. |
| 6,158,391 | A | 12/2000 | Simonetti |
| 6,167,841 | B1 | 1/2001 | Ho |
| 6,217,408 | B1 | 4/2001 | Willinger |
| 6,237,538 | B1 | 5/2001 | Tsengas |
| 6,415,741 | B2 * | 7/2002 | Suchowski et al. ........... 119/711 |
| 6,427,634 | B1 | 8/2002 | Mann |
| 6,485,349 | B1 | 11/2002 | Snyder et al. |

(Continued)

FOREIGN PATENT DOCUMENTS

WO 95/35137 12/1995
WO 98/52424 11/1998

OTHER PUBLICATIONS

Treat Dispensing Pickle Pocket downloaded from http://www.aboutdogtraining.com/product/1607/Treat-Dispensing-Pickle-Pocket.html on Jul. 11, 2012.

(Continued)

*Primary Examiner* — Trinh Nguyen
(74) *Attorney, Agent, or Firm* — Eckert Seamans Cherin & Mellott, llc; Brij K. Agarwal

(57) ABSTRACT

A treat dispenser for an animal having, in one embodiment, a container supported by a cage, the container having an opening for the dispensing of treats provided therein, and the cage preventing direct access to the opening by an animal. The cage and the container having a consistent outer periphery to enable rolling of the treat dispenser.

18 Claims, 7 Drawing Sheets

(56) References Cited

U.S. PATENT DOCUMENTS

| | | | |
|---|---|---|---|
| 6,526,912 B1 | 3/2003 | Ottoson | |
| 6,557,496 B2 | 5/2003 | Herrenbruck | |
| D494,716 S | 8/2004 | Chang | |
| 7,082,895 B2 | 8/2006 | Barney et al. | |
| 7,246,574 B2 * | 7/2007 | Renforth | 119/711 |
| D552,307 S | 10/2007 | Renforth et al. | |
| 7,389,748 B2 | 6/2008 | Shatoff et al. | |
| D579,157 S | 10/2008 | Edwards | |
| 7,506,613 B2 | 3/2009 | Wolfe, Jr. et al. | |
| 7,555,997 B2 | 7/2009 | Wolfe, Jr. et al. | |
| 7,591,234 B2 | 9/2009 | Shatoff et al. | |
| 7,600,488 B2 | 10/2009 | Mann | |
| 7,640,894 B2 | 1/2010 | Jager | |
| 7,681,763 B2 | 3/2010 | McGuyer | |
| 7,866,281 B2 | 1/2011 | Willinger | |
| D658,817 S | 5/2012 | Costello et al. | |
| 2007/0068464 A1 * | 3/2007 | Smith et al. | 119/709 |
| 2008/0121190 A1 | 5/2008 | Moulton | |
| 2009/0000565 A1 | 1/2009 | Bryce | |
| 2009/0038560 A1 | 2/2009 | Markham | |
| 2011/0000441 A1 | 1/2011 | Woltmann et al. | |
| 2011/0083608 A1 | 4/2011 | Markham et al. | |
| 2011/0139815 A1 | 6/2011 | Benson | |
| 2011/0214617 A1 | 9/2011 | Markham | |
| 2012/0012068 A1 | 1/2012 | Costello | |

OTHER PUBLICATIONS

Bob-A-Lot downloaded from http://aboutdogtraining.sitestreet.com/199/Bob-A-Lot.htm on Jul. 11, 2012.

Funkitty Egg-Cersizer downloaded from http://www.premier.com/View.aspx?page=cats/products/toys/funkitty/egg/description on Jul. 11, 2012.

Kibble Nibble downloaded from http://www.premier.com/View.aspx?page=dogs/products/toys/busybuddy/kibblenibbletoys on Aug. 6, 2012.

Magic Mushroom downloaded from http://www.premier.com/View.aspx?page=dogs/products/behavior/busybuddy/magicmushroom on Aug. 6, 2012.

ORKA Jack downloaded from http://www.petstages.com/product.php?Product_Index=26 on Aug. 6, 2012.

KONG Classic downloaded from http://www.kongcompany.com/products/for-dogs/rubber-toys/classic-rubber-toys/classic-2 on Aug. 6, 2012.

ORKA Tennis Ball downloaded from http://www.petstages.com/product.php?Product_Index=30 on Aug. 6, 2012.

* cited by examiner

TREAT DISPENSER

CROSS-REFERENCE TO RELATED APPLICATIONS

This application claims the benefit of U.S. Provisional Application 61/498,000 filed Jun. 17, 2011, the contents of which are incorporated herein by reference.

FIELD OF THE INVENTION

The present invention relates to a treat toys for animals generally, and more particularly to a treat dispenser having, in one embodiment, a treat-dispensing container housed within a rolling cage.

BACKGROUND

The prior art provides pet toys that dispense animal treats when the toy is rolled or otherwise manipulated. Such structures have a variety of forms and arrangements of holes and openings. These treat-discharging toys are generally comprised of a wall, forming a hollow body configured for rolling and defining an interior cavity and one or more openings being dimensioned and configured for passage of animal treats into and out of the cavity.

Despite the advancements in the art, a need remains for a treat dispenser which sustains a pets' attention for longer periods of time. Many pets have a relatively short attention span and are easily bored. What is needed is a new type of rolling treat dispenser which dispenses treats differently from the prior art, thereby sparking a pet's interests for longer periods of time.

SUMMARY

In accordance with one embodiment, a treat dispenser is provided with a treat-dispensing container housed within a partially spherically shaped rolling cage. The container is preferably formed from an elongated body having partially spherically shaped caps on either end that, when combined with the rolling cage, form opposite ends of the rolling treat dispenser. At least one cap is preferably removable relative to the body to provide access to the interior of the body and to allow for the insertion of treats to be stored within the body. When the treat dispensing body with partially spherically shaped caps is attached to the partially spherically shaped cage, the resulting structure forms a substantially complete sphere. The spherical shape of the combined structure allows a pet to roll the treat dispenser, thereby providing the pet with enjoyment over long periods of time. Furthermore, the cage acts as a see-through barrier to prevent the pet from having direct access to the treat-dispensing opening. This barrier may arouse the curiosity and interest of a pet, as the pet can see the treat being dispensed but cannot enjoy the treat until the treat falls through the cage portion.

DETAILED DESCRIPTION OF THE PREFERRED EMBODIMENTS

Figure 1:
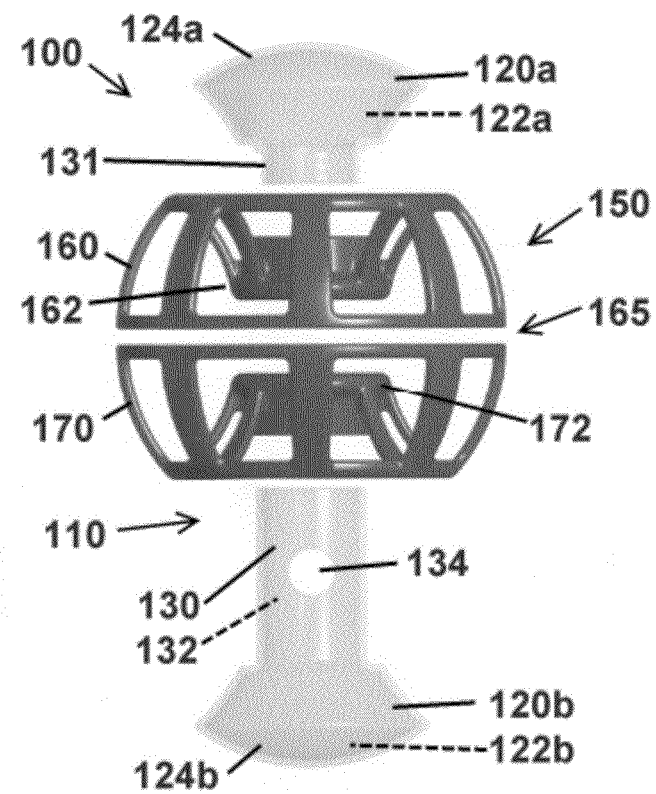
FIG. 1 is one embodiment of an exploded view of a treat dispenser of the present disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

In one embodiment, the present invention is directed to an animal treat dispensing device to enable a pet or an animal to partially control the dispensing of treats from the device while also providing the animal with a toy as a means for enjoyment. A "treat" as used herein is meant to include all animal foodstuffs that can be consumed by an animal, and may take various forms such as uniformly sized nuggets, or the treat may be irregularly sized and shaped. Other shapes and configuration are possible.

Figure 2:
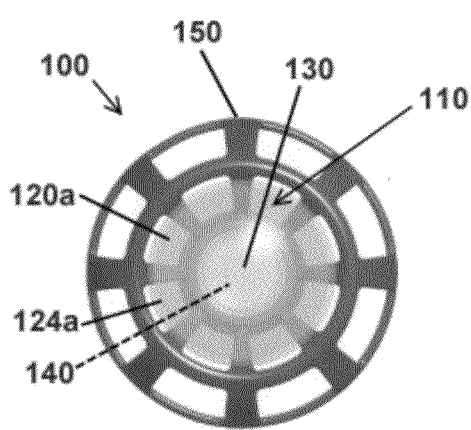
FIG. 2 is one embodiment of a top view thereof, the bottom view being identical.
Figure 3:
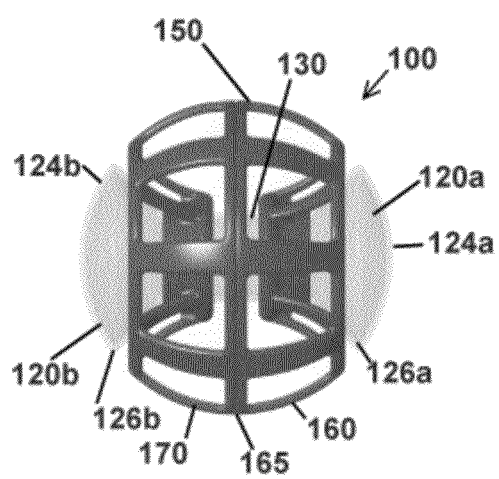
FIG. 3 is one embodiment of a side view of an assembled dispenser of FIG. 1.
Figure 4:
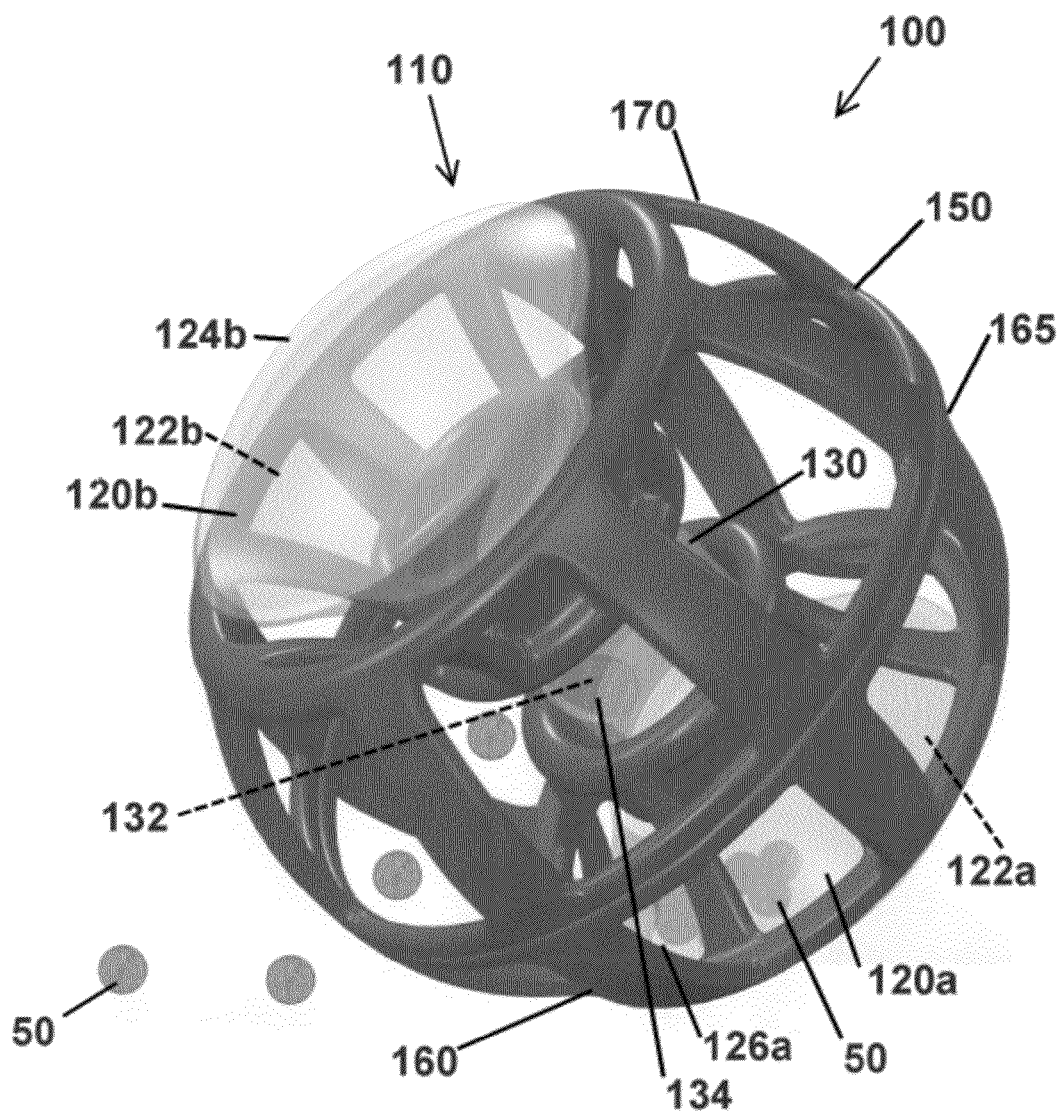
FIG. 4 is one embodiment of a three-dimensional view thereof.

FIG. 1 illustrates one embodiment of an exploded view of a treat dispenser 100 having a treat container 110 and a substantially spherical supporting cage 150. FIG. 2 is a top or bottom view, FIG. 3 is a side view and FIG. 4 is a three-dimension view of an assembled treat dispenser 100 of FIG. 1, including a treat container 110 and cage 150. The container 110 further comprises at least one cap 120a and 120b, each preferably having a hollow interior 122a and 122b, and each attached to an elongated central body 130 having a hollow interior 132, with the body 130 having at least one opening 134 for the dispensing of treats 50. The interiors of each cap 122a, 122b and body 132 form a continuous internal chamber 140 for the passage of treats 50 when the caps 120a, 120b are connected to the body 130. The size and shape of the at least one opening 134 may be adjustable to allow treats 50 of different sizes and shapes to be dispensed therethrough.

In the illustrated embodiment, the cap 120a is preferably semi-spherical (see FIGS. 2 and 4) and threadingly engaged with the body 130 and is removable relative thereto to provide access to both the interior 122a of the cap 120a and the interior 132 of the body 130 for the introduction of treats 50 into the internal chamber 140. The cap 120b may also be threadingly engaged via threads 131 with the body 130, or it may be fixed thereto. While the engagement of a cap with the central body is described as a threaded engagement, other connections are possible including a press fit, snap fit, quick release connection, and the like. The caps 120a, 120b may be transparent or translucent so that treats 50 captured within the interior 122a, 122b of the caps 120a, 120b would be visible to a pet.

The outer surface 124a and 124b of each cap 120a and 120b is preferably semi-spherical such that the combination of the caps 120a and 120b and the body 130 resemble a type of hourglass shape, with the caps 120a, 120b being wider than the body 130. More specifically, as will be described below, when the container 110 is engaged with the cage 150 and treats 50 are disposed within the container 110, and when the treat dispenser 100 is rolling around on the floor or ground, the shape of each cap will function to prevent the treats 50 from being easily dispensed through the opening 134 during play, but will instead result in the treats 50 being retained on a floor 126a, 126b of the interior 122a, 122b of each cap 120a, 120b. The floor 126a, 126b is realized when the dispenser 100 is on its side as shown in FIG. 3. The outer shape of each cap also assists in the rolling of the treat dispenser 100 as will be discussed below.

The cage 150 further comprises a plurality of sections including a first half 160 and a second half 170 that are, in one embodiment, attached together along a seam 165 by ultrasonic welding or the like to form a single structure. Alternatively, the cage 150 may initially be constructed in a single piece. Alternatively, as will be described in more detail in the embodiments of FIGS. 5-12 below, the cage halves may not be attached during the manufacturing process, but may instead be joined together and retained through the engagement of the treat container 110 and cap 120a. The cage 150 may be formed from a hard plastic such as nylon, rubber, natural rubber or the like, but should be sufficiently strong to resist tearing from an animal during play and yet enable bouncing and rolling along a support surface. Each cage half 160 and 170 further comprises a ring 162 and 172 that functions as a seat for each cap portion 120a and 120b. Each ring 162, 172 has a circumference that is slightly larger than that of the circumference of the body 130 of the container 110, such that the body 130 may easily, but firmly and securely slide through each of rings 162 and 172. The shape of each ring 162, 172 is configured to be consistent with the shape of the body 130. In the illustrated embodiment, the body 130 is cylindrical with a circular cross section, although other configurations are possible, i.e., where the shape of the cross section of the body 130 may also be a triangular, square, hexagonal, star-shaped, etc.

The container 110 is initially attached to the cage 150 by, in one embodiment, inserting the body 130 having only the cap 120b attached thereto, through the rings 172 and 162, where the cap 120b is used for gripping and manipulating the central body 130. Thereafter, the other cap 120a is threaded onto the central body 130 and attached thereto. As shown in FIGS. 2-4, the outer periphery of the treat dispenser 100, defined by the combination of the container 110 and cage 150, forms a substantially continuous outer contour where the polar ends of the dispenser 100 are formed by the caps 120a, 120b of the container 110, and where the surface contour of the caps 120a, 120b matches or substantially matches that of the cage 150 to allow the treat dispenser 100 to roll along a surface. The discontinuity formed by the spacing between the container 110 and cage 150 imparts a slight erratic movement when the dispenser 100 is rolled, which tends to both excite the animal and enhance the movement of the treats 50 within the internal chamber 140.

One embodiment of a method of using the treat dispenser 100 is as follows. Starting with the dispenser 100 as shown in FIGS. 2-4, where the container 110 is assembled relative to the cage 150, the cap 120a is removed from the body 130 to expose the interior 122a of the cap 120a and the interior 132 of the body 130, which interior 132 also extends to the interior 122b of the cap 120b that is attached at the other end of the body 130. If the dispenser 100 is held upright with the cap 120b positioned on a supporting surface, such as on a table or one's lap, treats may be inserted directly into the interior 132 of the body 130 and the interior 122b of the cap 120b and then the cap 120a may be reattached to the body 130. In this case, the exposed end of the body 130 extends beyond the ring 162 to provide direct access to allow the insertion of treats 50 into the interior 132 of the body 130. If the dispenser 100 is horizontally oriented as shown in FIGS. 2 and 3, then the treats 50 may be inserted into the interior 122a of the cap 120a, with the treats 50 coming to rest on the floor 126 of the interior 122a of the cap 120a as shown in FIG. 4, and then the cap 120a may be reattached to the body 130. Thereafter, an animal rolls the dispenser 100 around the ground or floor and the treats 50 move within the interior chamber 140 and are occasionally dispensed through the opening 134 of the body 130 when the treats 50 come into contact with the opening 134.

As the animal plays with and rolls the dispenser 100, treats 50 are dispensed from opening 134 onto the floor or ground for the animal to enjoy. As discussed previously, the caps 120a, 120b are configured to help to retain the treats 50 as the animal rolls the dispenser 100 along a surface. As shown in FIG. 4, several treats 50 remain in the interior 122a of the cap 120a while other treats 50 have been dispensed through the opening 134. As the animal continues to push and roll the dispenser 100, treats 50 may collide with the interior walls of caps 120a, 120b and body 130 to create an audible rattling or clicking sound, which may interest the pet to continue to play with the dispenser 100 in an effort to extract more treats 50.

The embodiment of FIG. 4 also illustrates how the cage 150 creates a see-through barrier to prevent the animal from having direct access to the opening 134 on the body 130. This barrier may arouse the curiosity and interest of the animal because it is a new way for the pet to obtain a treat 50. Many pets enjoy sniffing for a treat, and when located, desire to make direct contact with the treat. However, the cage 150 of the dispenser 100 does not permit the pet to make direct contact with opening 134, even though the pet can see the opening 134. This allows the pet to see the treat 50 being dispensed from the opening 134 even though the pet cannot enjoy the treat 50 until it falls through the cage 150.

Figure 5:
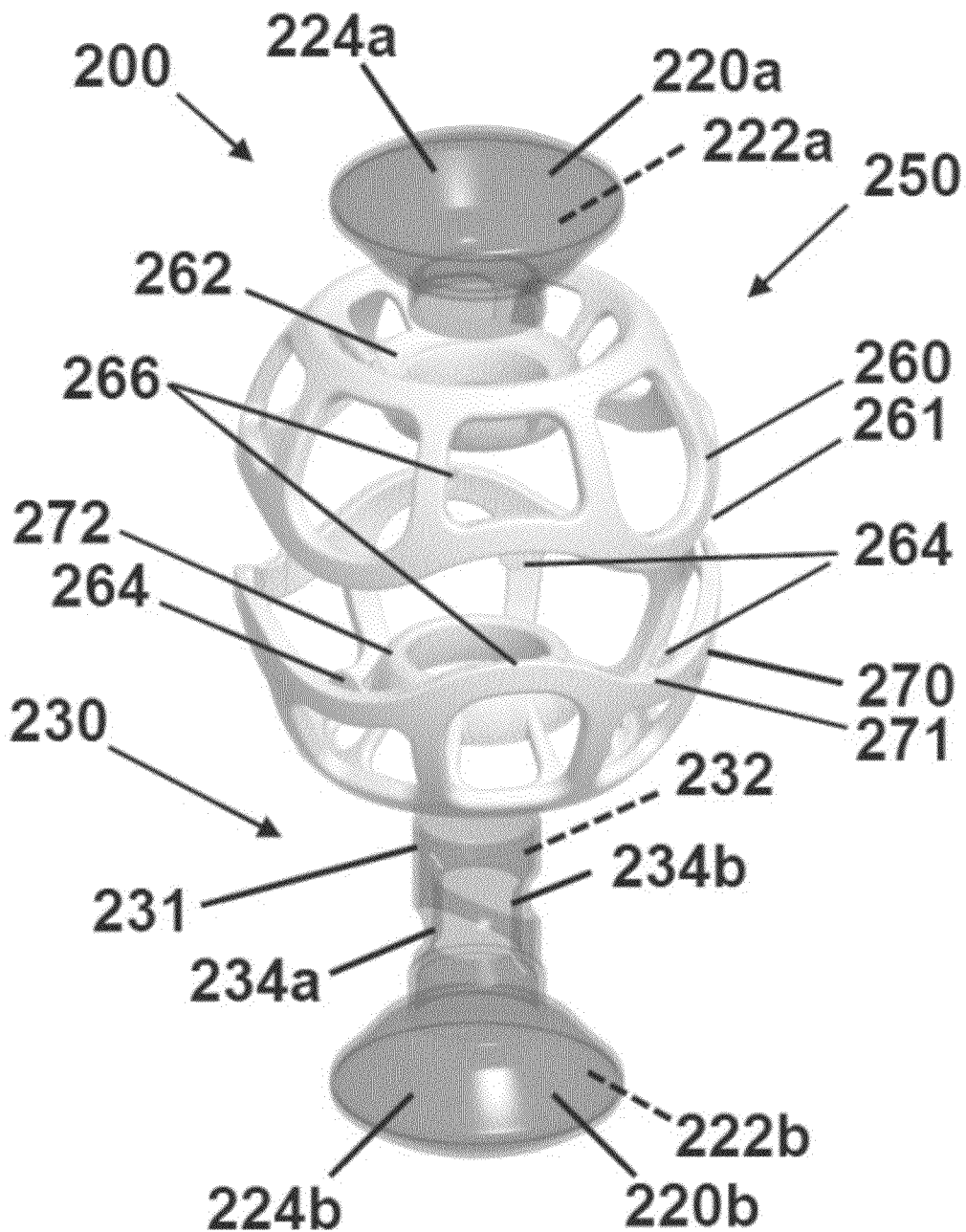
FIG. 5 is an alternative embodiment of an exploded view of a treat dispenser of the present disclosure.
Figure 6:
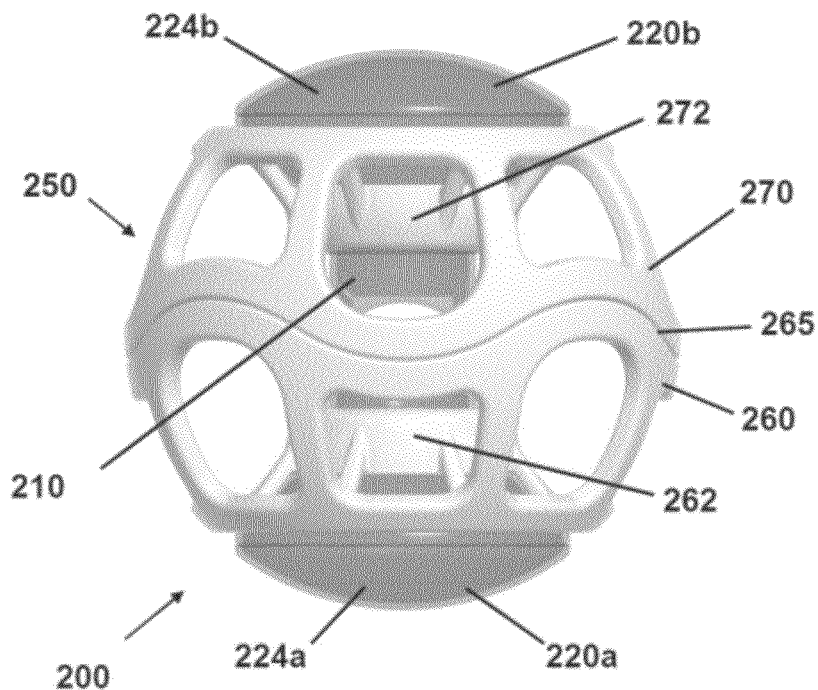
FIG. 6 is one embodiment of a side view of an assembled treat dispenser of FIG. 5.
Figure 7:
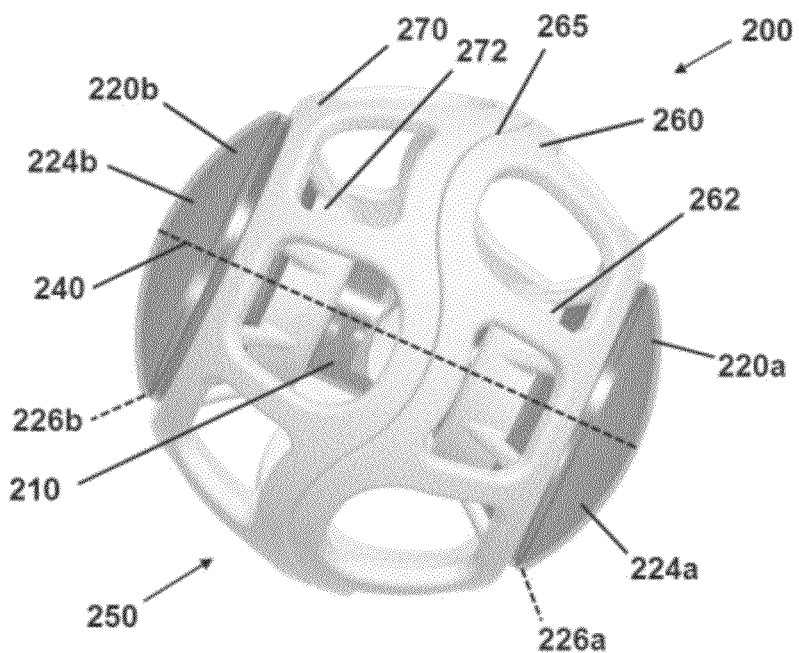
FIG. 7 is one embodiment of a tilted side view of an assembled treat dispenser of FIG. 5.

FIG. 5 illustrates an alternative embodiment of an exploded view of a treat dispenser 200 having a treat container 210 and a substantially spherical supporting cage 250. FIG. 6 is a side view and FIG. 7 is a tilted side view of an assembled treat dispenser 200 of FIG. 5, including a treat container 210 and cage 250. The container 210 further comprises at least one cap 220a and 220b, each preferably having a hollow interior 222a, 222b although such interiors may be partially or completely hollow or only one interior may be hollow which the other interior is not. Each cap 220a, 220b is preferably attached to an elongated central body 230 having a hollow interior 232, with the body 230 having at least one and more preferably, in this embodiment, a plurality of openings 234a, 234b (see FIGS. 8A and 8B) for the dispensing of treats 50. The interiors of each cap 222a, 222b and body 232 form a continuous internal chamber 240 (FIG. 7) for the passage of treats 50 when the caps 220a, 220b are connected to the body 230. The size and shape of the openings 234a, 234b may be adjustable to allow treats 50 of different sizes and shapes to be dispensed therethrough.

Figure 8A:
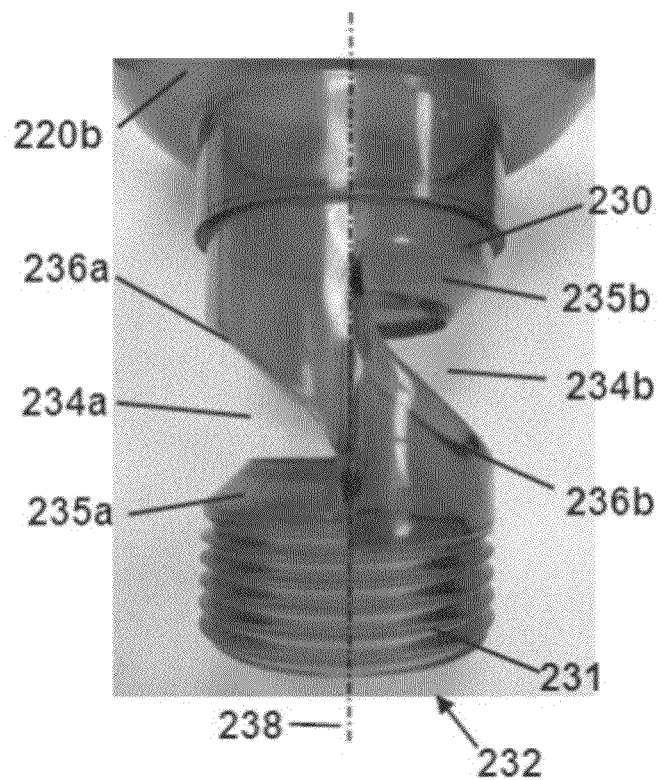
FIG. 8A is one embodiment of a portion of a treat body showing treat outlets.
Figure 8B:
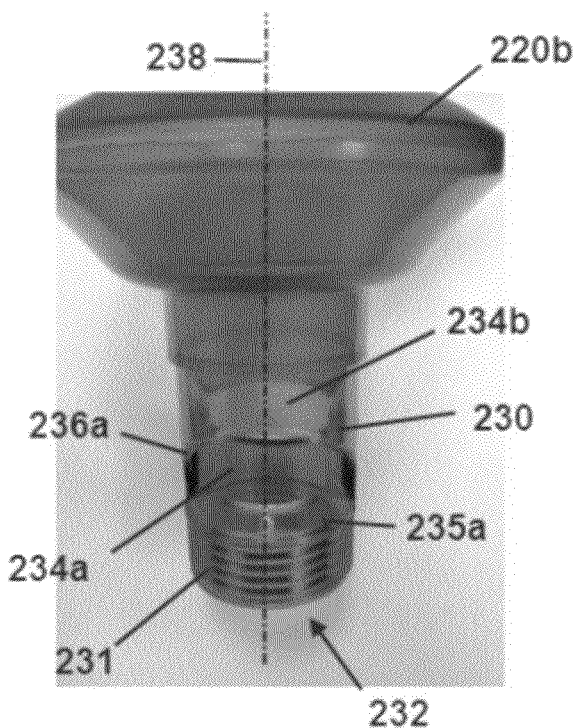
FIG. 8B is a rotated view of one embodiment of a portion of a treat body showing treat outlets.

FIGS. 8A and 8B illustrate close-up views of one embodiment of the container openings 234a, 234b, wherein each opening further comprises a first edge portion 235a, 235b that partially encircles a central axis 238 of the body 230, and a second edge portion 236a, 236b that partially extends along an outer wall of the body 230. The first portions 235a, 235b are preferably chamfered such that a treat 50 (not shown in FIGS. 8A and 8B) falling through the treat body 230 from the second portion 236a, 236b in the direction of the first portion 235a, 235b will impact the chamfered edge of the first portion and deflect outward and away from the body 230 and toward the pet (not shown). This also occurs by virtue of the first portion 235a, 235b being positioned inward (toward the central axis 238) relative to the second portion 236a, 236b. As shown in FIGS. 8A and 8B, the openings 234a, 234b are positioned on opposite sides of the body 230 to provide multiple outlets for dispensing of treats 50 (not shown). The opposite orientation also provides a treat with a similar path depending on whether the treat is moving from cap 220a to cap 220b, or vice versa. In other words, a treat is likely to impact one of the first portions 235a, 235b depending on which way it is traveling. Of course, a treat 50 may also exit from the container 210 without impacting one of the first portions 235a, 235b depending on movement of the treat 50 within the container 210 and depending on movement of the rolling treat dispenser 200 relative to a support surface.

In the illustrated embodiment, the cap 220a is preferably semi-spherical (see FIGS. 5-7) and threadingly engaged with the body 230 via threads 231 (see FIGS. 5, 8A and 8B) on the body 230, and is removable relative thereto to provide access to both the interior 222a of the cap 220a and the interior 232 of the body 230 for the introduction of treats 50 into the internal chamber 240. The cap 220b may also be threadingly engaged with the body 230, or it may be fixed thereto. While the engagement of a cap with the body is described as a threaded engagement, other connections are possible including a press fit, snap fit, quick release connection, and the like.

The outer surface 224a and 224b of each cap 220a and 220b is preferably semi-spherical such that the combination of the caps 220a and 220b and the body 230 resemble a type of hourglass shape, with the caps 220a, 220b being wider than the body 230. More specifically, as will be described below, when the container 210 is engaged with the cage 250 and treats 50 are disposed within the container 210, and when the treat dispenser 200 is rolling around on the floor or ground, the shape of each cap will function to prevent the treats 50 from being easily dispensed through the openings 234a, 234b during play, but will instead result in the treats 50 being retained on a floor 226a, 226b (FIG. 6) of the interior 222a, 222b of each cap 220a, 220b. The floor 226a, 226b is realized when the dispenser 200 is on its side as shown in FIG. 6. The outer shape of each cap also assists in the rolling of the treat dispenser 200 as will be discussed below.

In the illustrated embodiment, the cage 250 further comprises a plurality of sections including a first half 260 and a second half 270 that are separable and removably attachable along a sinusoidal seam 265 through the engagement of tabs 264 (FIG. 5) on one half that mate with recesses 266 (FIG. 5) on the other half. The tabs 264 and recesses 266 are preferably positioned in an alternating arrangement along the seam edges 261, 271 (FIG. 5) of the first and second halves 260, 270, such that each seam edge is preferably provided with both tabs 264 and recesses 266. Of course, all of the tabs 264 may be provided on one seam edge 261 and all of the recesses 266 may be provided on the other seam edge 271, or vice versa, or there can be a variety of different combinations of tabs 264 and recesses 266 along the seam edges 261, 271. The peripheral shape of the seam edges 261, 271 can be any contour including sinusoidal as shown or other linear or non-linear shapes as desired. A sinusoidal seam 265 inhibits relative movement of the first and second halves 260, 270 and provides for a stronger engagement of the halves 260, 270 during normal use of the treat dispenser 200. Alternatively, the cage 250 may initially be constructed as a single piece instead of two halves.

The cage 250 may be formed from a hard plastic such as nylon, rubber, natural rubber or the like, but should be sufficiently strong to resist tearing from an animal during play and yet enable bouncing and rolling along a support surface. Each cage half 260, 270 further comprises a ring 262, 272 that functions as a seat for each cap portion 220a, 220b. Each ring 262, 272 has a circumference that is slightly larger than that of the circumference of the body 230 of the container 210, such that the body 230 may easily, but firmly and securely slide through each of rings 262 and 272. The shape of each ring 262, 272 is configured to be consistent with the shape of the body 230. In the illustrated embodiment, the body 230 is cylindrical with a circular cross section, although other configurations are possible, i.e., where the shape of the cross section of the body 230 may also be a triangular, square, hexagonal, star-shaped, etc.

The treat dispenser 200 of the presently described embodiment is assembled by mating the tabs 264 and recesses 266 along the seam edges 261, 271 to interlock the cage halves 260, 270 along the seam 265. The treat container 210 is assembled to the interlocked cage halves 260, 270 by, in one embodiment, inserting the body 230, having only the cap 220b attached thereto, through the rings 272 and 262, where the cap 220b is used for gripping and manipulating the central body 230. Thereafter, the other cap 220a is threaded, by virtue of the threads 231, onto the central body 230 and attached thereto to create an assembled treat container 210. The assembly of the treat container 210, and in particular the compressive positioning of the caps 220a, 220b against the rings 262, 272 through the tightening of the cap 220a onto the body 230, functions to urge the cage halves 260, 270 toward each other and prevent the cage halves 260, 270 from separating during normal use of the treat dispenser 200. In effect, the treat container 210 locks in place the cage 250. The mating engagement of the tabs 264 and recesses 266 also facilitates securing together of the cage halves 260, 270. As shown in FIGS. 6 and 7, the outer periphery of the treat dispenser 200, defined by the combination of the container 210 and cage 250, forms a substantially continuous outer contour where the polar ends of the treat dispenser 200 are formed by the caps 220a, 220b of the container 210, and where the surface contour of the caps 220a, 220b matches or substantially matches that of the cage 250 to allow the treat dispenser 200 to roll along a surface. The discontinuity formed by the spacing between the container 210 and cage 250 imparts a slight erratic movement when the dispenser 200 is rolled, which tends to both excite the animal and enhance the movement of the treats 50 within the internal chamber 240.

Figure 9:
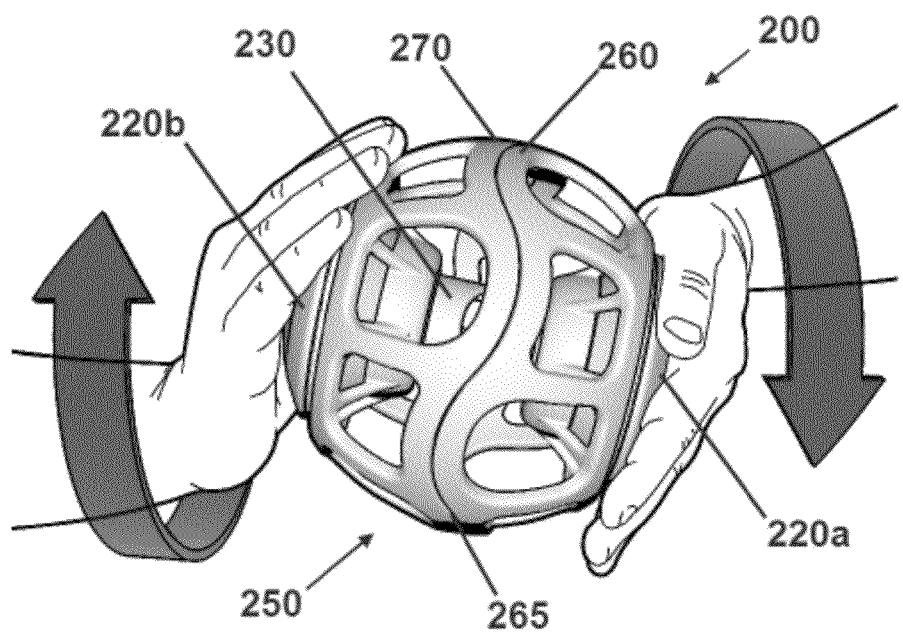
FIG. 9 illustrates one embodiment of a method of using a treat dispenser of the present disclosure.
Figure 10:
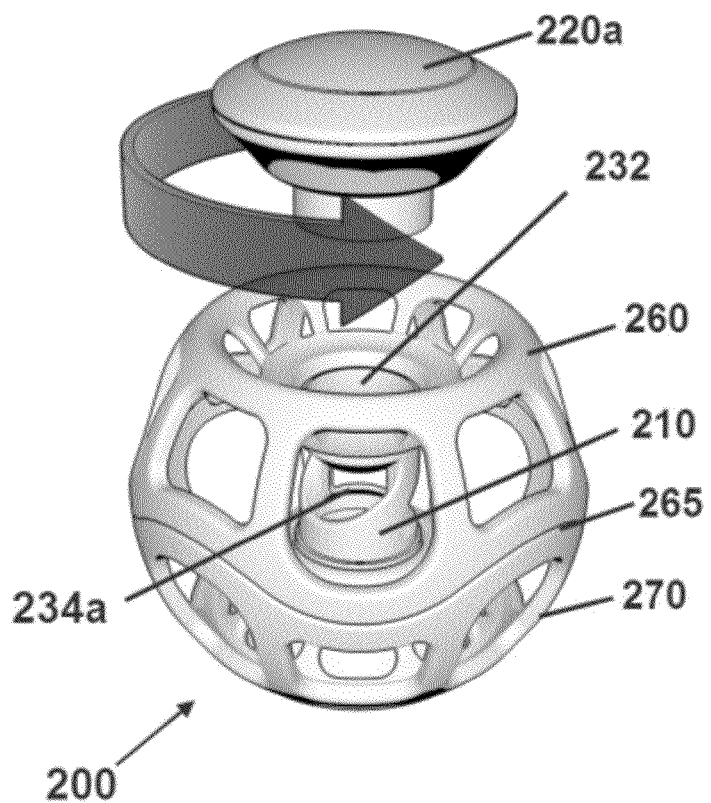
FIG. 10 illustrates one embodiment of a method of removing a cap from a treat dispenser of the present disclosure.
Figure 11:
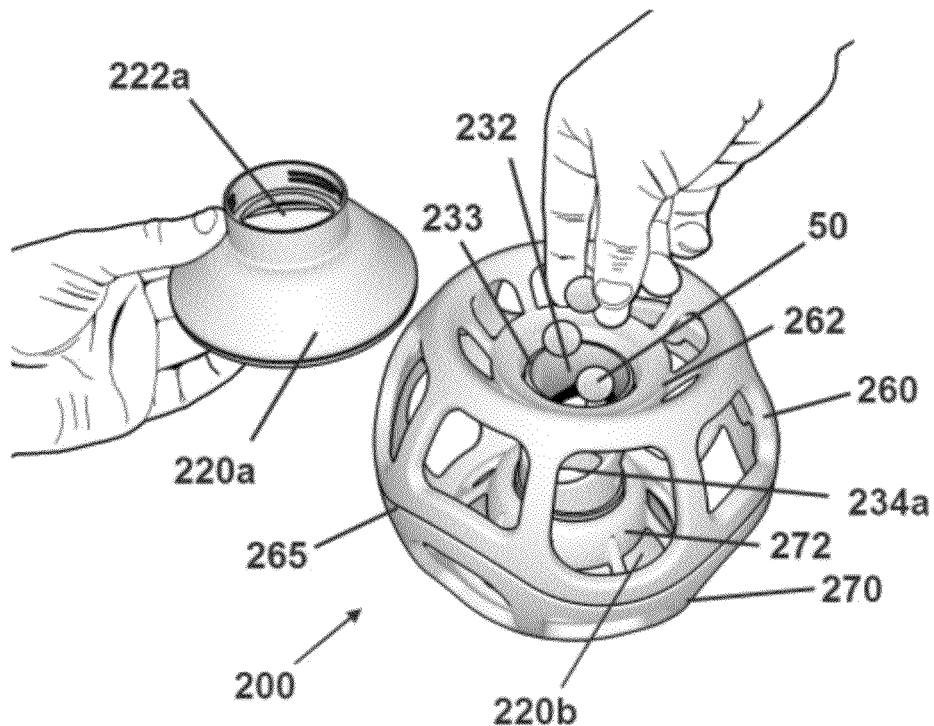
FIG. 11 illustrates one embodiment of a method of inserting treats into a treat dispenser of the present disclosure.
Figure 12:
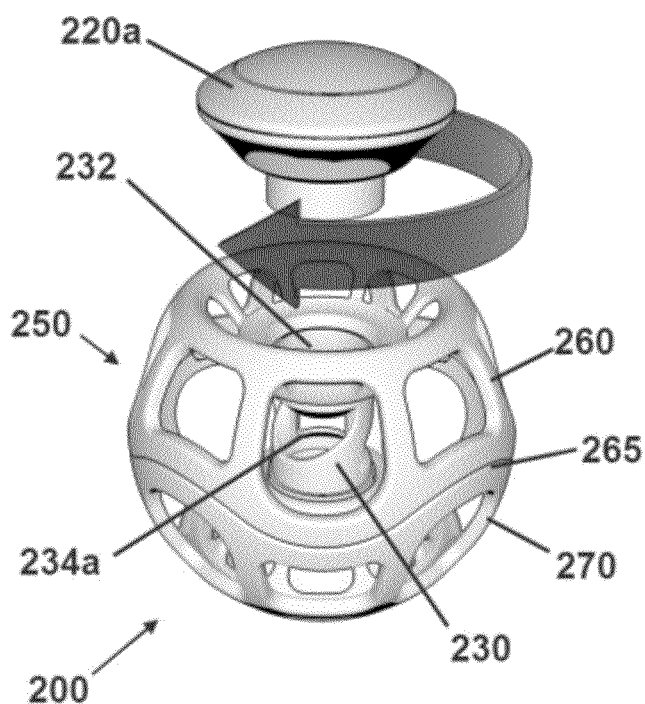
FIG. 12 illustrates one embodiment of a method of re-attaching a cap to a treat dispenser of the present disclosure.

One embodiment of a method of using the treat dispenser 200 is as follows. Starting with the dispenser 200 as shown in FIGS. 6-7, where the container 210 is assembled relative to the cage 250, the cap 220a is loosened relative to the body 230 by gripping both caps 220a, 220b simultaneously and then counter-rotating the caps 220a, 220b to loosen the cap 220a relative to the body 230 as shown in FIG. 9. Cap 220a is then un-threaded from the body 230 as shown in FIG. 10 to expose the interior 222a of the cap 220a and the interior 232 of the body 230 as shown in FIG. 11, which interior 232 also extends to the interior 222b of the cap 220b (shown in FIG. 5) that is attached at the other end of the body 230. If the dispenser 200 is held upright with the cap 220b positioned on a supporting surface, such as on a table or one's lap, treats 50 may be inserted directly into the interior 232 of the body 230 and the interior of the cap 220b as shown in FIG. 11 and then the cap 220a may be reattached to the body 230 as shown in FIG. 12. In this case, the exposed end 233 of the body 230 extends beyond the ring 262 to provide direct access to allow the insertion of treats 50 into the interior 232 of the body 230 as shown in FIG. 11. If the dispenser 200 is horizontally oriented as shown in FIG. 7, then the treats 50 may be inserted into the interior 222a of the cap 220a, with the treats 50 coming to rest on the floor 226 of the interior 222a of the cap 220a, and then the cap 220a may be reattached to the body 230. Thereafter, an animal rolls the dispenser 200 around the ground or floor and the treats 50 move within the interior chamber 240 and are occasionally dispensed through the openings 234a, 234b of the body 230 when the treats 50 come into contact with the openings 234a, 234b.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A treat dispenser for an animal comprising a container supported by a cage, the container having at least one opening for the dispensing of treats provided therein, the cage preventing direct access to the at least one opening by an animal yet permitting treats that are dispensed through the at least one opening to fall through the cage and to be enjoyed by the animal, and the cage and container enabling rolling of the dispenser, the container further comprising a body and a cap on opposite ends of the body, each cap having a contour that is consistent with an outer periphery of the cage to enable rolling of the treat dispenser.

2. The treat dispenser of claim 1, the container further comprising a body and at least one removable cap.

3. The treat dispenser of claim 2, wherein the at least one removable cap is threadingly engaged with the body.

4. The treat dispenser of claim 1, the container further comprising at least one cap having an interior for retaining treats.

5. The treat dispenser of claim 1, wherein the caps are wider than the body such that the container assumes an hourglass shape.

6. The treat dispenser of claim 5, wherein the cage is formed from a plurality of separable sections that are held together by the container.

7. The treat dispenser of claim 6, wherein at least one cap is removable from the body and wherein the plurality of separable sections is held together through the engagement of the at least one cap with the body.

8. The treat dispenser of claim 1, wherein the cage is formed from a plurality of sections joined along a seam.

9. The treat dispenser of claim 8, wherein the plurality of sections are separable.

10. The treat dispenser of claim 8, wherein the seam is non-linear.

11. The treat dispenser of claim 10, wherein the seam is sinusoidal.

12. The treat dispenser of claim 11, wherein the plurality of sections are separable.

13. The treat dispenser of claim 12, wherein the plurality of sections interlock along the seam.

14. The treat dispenser of claim 13, wherein the interlock further comprises a mating tab and recess.

15. The treat dispenser of claim 14, wherein the cage is formed from a hard plastic such as nylon, rubber, or natural rubber.

16. The treat dispenser of claim 1 wherein a continuous internal treat chamber is defined between each cap through an interior of the body.

17. A treat dispenser for an animal comprising a container supported by a cage, the container having at least one opening for the dispensing of treats provided therein, the cage preventing direct access to the at least one opening by an animal yet permitting treats that are dispensed through the at least one opening to fall through the cage and to be enjoyed by the animal, and the cage and container enabling rolling of the dispenser, the container further comprising a plurality of openings relative to a central axis of the container, each opening having a first portion that is closer to the central axis than a second portion.

18. A treat dispenser for an animal comprising a container supported by a cage, the container having at least one opening for the dispensing of treats provided therein, the cage preventing direct access to the at least one opening by an animal yet permitting treats that are dispensed through the at least one opening to fall through the cage and to be enjoyed by the animal, and the cage and container enabling rolling of the dispenser, the container further comprising a plurality of openings relative to a central axis of the container, each opening having at least one chamfered edge that facilitates the deflection of treats away from the container.

* * * * *

UNITED STATES PATENT AND TRADEMARK OFFICE
CERTIFICATE OF CORRECTION

PATENT NO. : 8,746,182 B2
APPLICATION NO. : 13/524435
DATED : June 10, 2014
INVENTOR(S) : Norman Anderson Page 1 of 1

It is certified that error appears in the above-identified patent and that said Letters Patent is hereby corrected as shown below:

On the title page, item (74) Attorney, Agent, or Firm -, "Eckert Seamans Cherin & Mellott, llc" should read --Eckert Seamans Cherin & Mellott, LLC--.

In the Specification
Column 1, line 12, "toys" should read --toy--.
Column 1, line 28, "pets'" should read --pet's--.
Column 1, line 32, "interests" should read --interest--.
Column 2, line 34, "derivative" should read --derivatives--.
Column 2, line 41, "similar refer" should read --similar words refer--.
Column 4, line 16, "be a triangular" should read --be triangular--.
Column 6, line 19, "226a, 226b (FIG. 6)" should read --226a, 226b (FIG. 7)--.
Column 6, line 21, "FIG. 6" should read --FIG. 7--.
Column 6, line 60, "be a triangular" should read --be triangular--.

Signed and Sealed this
Twenty-fourth Day of February, 2015

Michelle K. Lee
*Deputy Director of the United States Patent and Trademark Office*